US012142988B2

United States Patent
Uihlein et al.

(10) Patent No.: US 12,142,988 B2
(45) Date of Patent: Nov. 12, 2024

(54) TRANSPORT SYSTEM, SET FOR ASSEMBLING A TRANSPORT SYSTEM, AND METHOD OF RETROFITTING A PLUG CONNECTOR IN A TRANSPORT SYSTEM

(71) Applicant: Schneider Electric Industries SAS, Rueil-Malmaison (FR)

(72) Inventors: Tobias Uihlein, Tauberbischofsheim-Distelhausen (DE); Frank Hartmann, Kist (DE); Martin Stollberger, Waldbuettelbrunn (DE); Volker Muellerschoen, Hoechberg (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 413 days.

(21) Appl. No.: 17/449,956

(22) Filed: Oct. 5, 2021

(65) Prior Publication Data
US 2022/0131438 A1    Apr. 28, 2022

(30) Foreign Application Priority Data

Oct. 28, 2020   (EP) .................................... 20306295

(51) Int. Cl.
*H02K 41/02*      (2006.01)
*B60L 15/00*      (2006.01)
(Continued)

(52) U.S. Cl.
CPC ............ *H02K 5/225* (2013.01); *B65G 23/23* (2013.01); *B65G 35/00* (2013.01); *B65G 54/02* (2013.01); *H01R 43/26* (2013.01); *H02K 41/031* (2013.01)

(58) Field of Classification Search
CPC ...... H02K 5/225; H02K 41/02; H02K 41/031; B60L 15/00; B65G 35/00; B65G 54/02; F16C 32/04; H01R 43/26
(Continued)

(56) References Cited

U.S. PATENT DOCUMENTS 5,565,718 A      10/1996  Takei
5,644,176 A  *   7/1997   Katagiri ............... H02K 41/031
                                                   310/68 B
(Continued)

FOREIGN PATENT DOCUMENTS

DE     10 2011 118 360 A1    5/2013
DE     11 2016 007 256 T5    6/2019
(Continued)

OTHER PUBLICATIONS

US 2015/016812 A1, Da Conceicao Rosa, Jun. 11 (Year: 2015).*
(Continued)

Primary Examiner — Douglas A Hess
(74) Attorney, Agent, or Firm — Oblon, McClelland, Maier & Neustadt, L.L.P.

(57) ABSTRACT

A transport system, in particular a multi-carrier system, includes a plurality of linear motors, which are arranged in a row and form a guide track, and at least one transport element that can be moved along the guide track with the linear motors. The linear motors each have at least a first connection region, which faces and is associated with a linear motor disposed upstream along the guide track, and a second connection region, which faces and is associated with a linear motor disposed downstream along the guide track, wherein a respective plug connector mechanically connects the first connection region of a linear motor disposed downstream along the guide track and the second connection region of a linear motor disposed upstream along
(Continued)

the guide track to one another and establishes a power connection and/or a signal connection between the neighboring linear motors.

22 Claims, 5 Drawing Sheets

(51) Int. Cl.
   *B65G 23/23*    (2006.01)
   *B65G 35/00*    (2006.01)
   *B65G 54/02*    (2006.01)
   *F16C 32/04*    (2006.01)
   *H01R 43/26*    (2006.01)
   *H02K 5/22*     (2006.01)
   *H02K 41/03*    (2006.01)

(58) Field of Classification Search
   USPC .......................................................... 198/616
   See application file for complete search history.

(56) References Cited

U.S. PATENT DOCUMENTS

| | | | | |
|---|---|---|---|---|
| 7,466,043 B2* | 12/2008 | Han | ........................ | H02K 41/02 310/13 |
| 8,159,809 B2* | 4/2012 | Gabara | ............. | B01L 3/502715 174/254 |
| 9,525,331 B2* | 12/2016 | Mukai | .................. | H02K 11/215 |
| 9,647,511 B2* | 5/2017 | Morel | ..................... | H02K 41/03 |
| 9,997,985 B2* | 6/2018 | Prüssmeier | ............. | H02K 41/03 |
| 11,021,335 B2* | 6/2021 | Sinzenich | .............. | B65G 45/00 |
| 11,251,575 B2* | 2/2022 | Meghpara | .......... | H01R 12/7023 |
| 2019/0202639 A1 | 7/2019 | Mukai | | |

FOREIGN PATENT DOCUMENTS

| | | |
|---|---|---|
| EP | 3 569 528 A1 | 11/2019 |
| EP | 2 779 390 B1 | 5/2020 |
| JP | 6-80379 U | 11/1994 |
| TW | 200952308 A1 | 12/2009 |
| WO | WO 2019/150718 A1 | 8/2019 |

OTHER PUBLICATIONS

US 2023/0142831 A1, Saito, May 11 (Year: 2023).*
US 2024/0067238 A1, Seal et al., Feb. 29 (Year: 2024).*
Office Action issued Jan. 19, 2024, in corresponding Canadian Patent Application No. 3.133,699, 6 pages.
Extended European Search Report issued Apr. 6, 2021 in corresponding European Patent Application No. 20306295.5 (with English Translation of Category of Cited Documents), 12 pages.

* cited by examiner

TRANSPORT SYSTEM, SET FOR ASSEMBLING A TRANSPORT SYSTEM, AND METHOD OF RETROFITTING A PLUG CONNECTOR IN A TRANSPORT SYSTEM

The present invention relates to a transport system, in particular a multi-carrier system, to a set for assembling a transport system, and to a method of retrofitting a plug connector in a transport system. The transport system comprises a plurality of linear motors, which are arranged in a row and form a guide track, and at least one transport element that can be moved along the guide track by means of the linear motors.

Transport systems, i.e. in particular multi-carrier systems, preferably comprise a large number of transport elements, so-called carriers, that are moved by means of a plurality of linear motors arranged along the guide track. The transport elements are in this respect movable individually and independently of one another such that multi-carrier systems provide the possibility of being flexibly adapted to different industrial processes and can in particular also react flexibly to changes in an industrial process.

A further aspect of providing a transport system that can be used in as versatile a manner as possible is to be able to adapt the transport system in its design and with respect to its use and the connection of possible additional devices. A design and conversion of the transport system and a connection of possible additional components to said transport system should therefore be possible with as little effort as possible.

The invention consequently has the underlying object of proposing a transport system that has an increased flexibility with respect to a design, a conversion, and the connection of additional components.

This object is satisfied in accordance with the invention by a transport system in accordance with claim 1.

The transport system in accordance with the invention is in particular a multi-carrier system and comprises a plurality of linear motors, which are arranged in a row and form a guide track, and at least one transport element that can be moved along the guide track by means of the linear motors, wherein the linear motors each have at least a first connection region, which faces and is associated with a linear motor disposed upstream along the guide track, and a second connection region, which faces and is associated with a linear motor disposed downstream along the guide track, wherein a respective plug connector mechanically connects the first connection region of a linear motor disposed downstream along the guide track and the second connection region of a linear motor disposed upstream along the guide track to one another and establishes a power connection and/or a signal connection between the neighboring linear motors, wherein the first connection regions of the linear motors are each identically arranged and formed at the linear motors, and wherein the second connection regions of the linear motors are each identically arranged and formed at the linear motors such that the linear motors and the plug connectors are interchangeable with one another.

The invention is based on the recognition that a transport system that can be easily adapted to the currently prevailing requirements can be provided due to the interchangeability of the linear motors and connectors with one another. In addition, the time effort required for the assembly and conversion of the transport system is e.g. reduced since in particular no cabling has to be reconnected or released in a complex and/or expensive manner, for example, in the interior of a linear motor. Instead, the cabling is simply established by the plug connector or the plug connectors. In this respect, it is possible to interchange and replace the linear motors and the plug connectors with one another— within certain limits.

The interchangeability is therefore in particular made possible by the plug connector that can also be used in different embodiments within the transport system. Thus, one plug connector can e.g. be used for power transmission, but another plug connector can be used for signal transmission. Since the different plug connectors are, however, preferably placed on a mechanically identical base body and are typically used a plurality of times in the same embodiment within the transport system, the abovementioned interchangeability can be achieved.

Furthermore, additional functions can also be implemented in the transport system by the plug connector, for example the integration of digital components, power supplies, etc., as described in more detail in the following. These additional functions can be accommodated in the plug connector and are consequently automatically included in the transport system on the plugging of the plug connectors into the reception region. In addition, the plug connector can also effect a mechanical alignment of the linear motors, as will be discussed in more detail in the following. The plug connector therefore contributes towards fundamentally simplifying the transport system and its assembly and conversion, wherein a flexible design is nevertheless possible.

The plug connectors result in a mechanical connection of two adjacent linear motors, i.e. of two linear motors arranged next to one another, on the one hand, and in a power connection and/or a signal connection, on the other hand. Since the plug connectors can be completely released from the linear motors, a linear motor can be removed from the transport system as soon as no more plug connectors are plugged to the two neighboring linear motors and optional further fastenings to the linear motors have been removed. By removing the plug connectors, the mechanical and electrical connections of the plug connector to the neighboring linear motors are accordingly separated. Conversely, linear motors newly arranged in a row preferably only have to be coupled by a plug connector so that they are mechanically and electrically connected to one another.

Further details of the invention will be explained in the following.

A power connection is in particular to be understood such that electrical power for operating the linear motors is transmitted from the linear motor connected upstream to the linear motor connected downstream through said power connection by means of the plug connector. For example, more than the electrical power required by the linear motor can be transmitted by the power connection(s) of a linear motor for supplying segment groups described in more detail in the following. For example, a linear motor can have a requirement of approximately 10 A to 20 A and the power connection(s) can be configured to transmit approximately 60 A to 75 A. The signal connection is preferably understood as an electrical connection by which electrical control signals and/or data signals are in particular transmitted from the linear motor connected upstream to the linear motor connected downstream. Signals for fieldbuses (e.g. Sercos), Ethernet, enable signals, signals for the communication of the linear motors and the like are examples of control signals and/or data signals.

The linear motors arranged in a row in particular form segments of the transport system and can also be designated as such in the following. The linear motors preferably each have a separate housing, with side walls of the housings of neighboring linear motors extending approximately in parallel with one another and only being spaced apart from one another by a gap approximately 0.1 mm to 0.2 mm wide to avoid that the transport system comes under mechanical stress when the housings expand. Alternatively to the gap, the side walls can also adjoin one another without a gap and a really contact one another.

Since in each case, on the one hand, the first connection regions of the linear motors are identically arranged and formed at the linear motors and, on the other hand, the second connection regions of the linear motors are also each identically arranged and formed at the linear motors, it is ensured that the linear motors form a uniformly designed and positioned interface for the plug connectors.

Since in each case the first connection regions and in each case the second connection regions are identically arranged at a linear motor, this means that they are, for example, arranged at a uniform position on a surface or an outer surface of the linear motor, in particular a surface of the respective housing. The uniform position in each case applies with respect to neighboring linear motors such that it is also ensured that linear motors that form curve segments can be arranged in a row with linear motors that form straight segments. Thus, first and second connection regions at neighboring linear motors, which are provided for a connection of the linear motors by means of the same plug connector, are identically arranged relative to one another and thereby have the same spacings from one another in each case. The fact that the connection regions are identically arranged at the linear motors can, for example, mean that they have the same spacing from the guide track in each case.

Each linear motor can in particular have six outer surfaces, namely an upper side, a lower side, an outer side, an inner side, and two side surfaces. In this respect, the side surfaces of neighboring linear motors are spaced apart from one another by a small expansion gap of approximately 0.1 mm to 0.2 mm or directly contact one another. The guide track for the transport elements can be formed at the outer side, wherein rollers of the transport elements are disposed on the outer side. The transport elements can also extend into a region above the upper side by means of a bend, wherein workpieces and the like can be transported on the transport elements above the upper side. The inner side is arranged in the region of an inner space. The plug connectors are preferably arranged in the upper side and/or the lower side.

The plug connectors can be configured to establish a power connection and a signal connection between neighboring linear motors or they can be configured to establish either a power connection or a signal connection between neighboring linear motors. Neighboring linear motors can preferably be connected by a plug connector, which establishes a power connection between the neighboring linear motors, and by a further plug connector that provides a signal connection between the neighboring linear motors. As will be stated in more detail in the following, the plug connectors can have a first plug-in region, which preferably contacts one of the neighboring linear motors at its first connection region, and a second plug-in region that preferably contacts the other of the neighboring linear motors at its second plug-in region.

The plug connectors for establishing a signal connection between the neighboring linear motors can in particular be designed with a high polarity, i.e. they can, for example, enable at least 8, 16 or at least 32 separate electrical connections between two linear motors.

The transport system or the multi-carrier system can in particular be peripherally formed, i.e. the linear motors form a closed guide track along which the transport element or the transport elements can theoretically be endlessly moved in the same direction. In this respect, the transport element or the transport elements can, for example, be moved on rollers and can be magnetically driven. For this purpose, the transport elements have one or more permanent magnets that are acted on by a driving force by means of a changing and/or wandering magnetic field that is generated by the linear motors. The driving force leads to a movement of the transport elements along the guide track. Workpieces can thereby, for example, be transported along the guide track by means of the transport elements.

A plurality of linear motors are arranged behind one another along the guide track. A plurality of transport elements can preferably be simultaneously arranged at the guide track and can in particular be moved independently and separately of one another.

To hold the transport elements on the guide track, they are preferably attracted toward the guide track by means of an attractive force in a direction perpendicular to the direction of movement of the transport element. Thus, the attractive force also extends perpendicular to the driving force. The attractive force preferably extends from the guide track toward the linear motors or toward the coils of the linear motor. The attractive force is typically generated in that the magnet of the transport element is attracted by a magnetically conductive stator of the respective linear motor.

The transport element can also be designated as a carrier, a mover, or a runner; the linear motor can, in contrast, also be designated as a stator.

Advantageous further developments of the invention can be seen from the description, from the Figures, and from the dependent claims.

The first connection region of a linear motor disposed downstream along the guide track and the second connection region of a linear motor disposed upstream along the guide track preferably merge into one another and together form a reception region in which a respective plug connector is received. The connection regions therefore merge into one another such that the reception region is contiguous when the linear motors are arranged adjacent to one another. This allows the plug connectors to be designed as simply as possible geometrically, for example with a plate-shaped base body. It is also possible for the plug connector to end flush with the housings of the linear motors in the plugged-in state. The plug connector therefore does not produce an elevated portion or the like that could e.g. impede the installation of the transport system into existing systems.

The reception region can be formed by two depressions provided at the neighboring linear motors, with the plug connector preferably being disposed in a flush manner in the reception region and aligning the neighboring linear motors with one another. In this respect, the plug connector or at least a section of the plug connector can, for example, be rectangular and/or plate-shaped and/or have rounded corners and, in this case, the reception region is formed as a pocket such that it corresponds to the shape of the plug connector. If the reception region is formed by depressions, the plug connector can contact boundary surfaces of the reception region, i.e. walls of the two depressions, in a flush manner with boundary surfaces of its plate-shaped base body such that the neighboring linear motors to which the plug connector is connected are aligned with one another. This means that the base body of the plug connector prevents a displacement and/or a movement of the neighboring linear motors relative to one another.

The plug connector and the boundary surfaces of the reception region preferably directly contact one another at least in a range of 5 cm$^2$ or of at least 10 cm$^2$, wherein a force counteracting a displacement and/or a movement is preferably and if necessary generated by the contact in this range. The plug connector thereby not only contributes towards the electrical cooperation of the linear motors, but also supports the mechanical design and the mechanical stability.

To further simplify the alignment of the linear motors, the plug connector or in particular a plurality of plug connectors can have an alignment aid described in more detail in the following.

The reception region preferably has a recess (i.e. likewise a depression) extending away from the depression, with the plug connector preferably having a secondary section that preferably engages into the recess in a flush manner. This has the advantage, on the one hand, that a further flush mechanical contact, namely between the recess and the secondary section, is established that facilitates the alignment of the linear motors and, on the other hand, that the secondary section can be used to provide the plug connector with a possibility of feeding in current and/or (data) signals. This is in particular the case when the secondary section projects from the linear motors approximately transversely and approximately horizontally to the guide track, in particular in a direction away from the guide track. In a closed topology of the transport system, the secondary section can therefore be directed into an inner space or toward an inner side of the transport system.

The plug connector preferably has a first plug-in region, which contacts one of the neighboring linear motors, in particular mechanically and/or electrically, and a second plug-in region that contacts the other of the neighboring linear motors, in particular mechanically and/or electrically. Respective plug-in elements, for example electrical contacts, by means of which the plug connector is connected to the linear motors, can be provided at the plug-in regions. The plug-in regions can, for example, be arranged in parallel with one another at oppositely disposed sides of the plug connector.

More specifically, the plug connector can have a plate-shaped base body at which, in particular at oppositely disposed ends, the two plug-in regions are arranged. In the plug-in regions, a respective plurality of plug-in elements are preferably arranged that are in particular electrically connected to plug-in elements of the respective other plug-in region by electrical lines extending within the base body. The plug-in elements can be commercially available plugs, for example plugs of the FX23 series from the company Hirose and/or plugs of the Molex CST system. Any desired plugs for establishing power connections and/or signal connections can generally be used as plug-in elements in the plug-in regions.

The plug-in elements can project from the base body in the direction of a normal vector from a plane spanned by the base body. All the plug-in elements preferably face in the same direction in this respect.

It is understood that plug-in elements, which are designed complementary to the plug-in elements of the respective plug-in region, can likewise be provided in the respective connection regions of the linear motors. The plug-in elements of the plug connector and of the linear motors thus establish electrical connections between the plug connectors and the linear motors.

To establish a power connection and/or a signal connection between the first connection region and the second connection region of neighboring linear motors, the plug-in elements in the interior of the plug connector can be electrically connected to one another via a circuit board or lines running there, for example busbars composed of metal. To be able to conduct high currents (e.g. $\geq 70$ A), the circuit board can be provided with a copper layer up to 400 μm thick. In addition, the plug-in elements can be designed as SMD components.

As mentioned, the plug connectors may be designed differently in that they can further be configured to connect to an external power supply, a fieldbus (in particular Sercos), a sensor-actuator unit (for example, an RFID reading device), or other additional devices, or in that an additional device can be integrated into the plug connectors. Thus, depending on which plug connector type is used between neighboring linear motors, either a pure power bridge or signal bridge can be established between the neighboring linear motors, or additional electrical power can be fed in or an additional device can be integrated.

In an advantageous embodiment, the plug connector can have a third plug-in region for feeding in current and/or signals, in particular a signal for a safety shutdown that is also designated as a "safe force off signal" and that will be described in further detail in the following. The third plug-in region can, for example, be provided at the secondary section. The secondary section preferably extends out of the plate-shaped base body, wherein the secondary section, however, preferably extends in the plane spanned by the base body. The third plug-in region is in particular arranged in an end region of the secondary section. The third plug-in region is not directly electrically and mechanically connected to one of the two linear motors, but, for example, to an external power supply, a fieldbus, or a sensor-actuator unit such as an RFID reading device. The third plug-in region is preferably arranged at an inner side of the linear motors, i.e. at a side remote from the guide track. Thus, cables can be guided to the third plug-in region without disturbing the movement of the transport element along the guide track. The third plug-in region can, for example, have a power connection which can be pivoted about its own vertical axis, which preferably extends approximately perpendicular to a direction of extent of the secondary section, and by means of which the linear motor and thus the transport system are supplied with electrical power. The pivotability enables the flexible positioning of a corresponding power source and a guidance of a corresponding (power) line that disturbs as little as possible.

In the third plug-in region, a plug-in element can, for example, be attached that implements the aforementioned power connection. This plug-in element can have one of the abovementioned plugs or can also have an M17 or M23 plug for currents up to 20 A, 40 A, or 70 A.

The plug-in element or the plug-in elements of the third plug-in region can be directed in the same direction as the plug-in elements of the first and second plug-in regions. Alternatively, the plug-in element(s) of the third plug-in region can also face in a direction tilted by 90°, in particular in a direction away from the guide track.

In the region of the third plug-in region or also adjacent to the third plug-in region, the secondary section can be thickened or raised compared to the plate-shaped base body. An accidental plugging of the plug-in elements of the third plug-in region into plug-in elements of the connection regions can hereby be prevented.

Alternatively, the third plug-in region can also be arranged on a rear side of the plate-shaped base body and can in particular project away from the linear motor when the plug connector is plugged in.

It is understood that a decoupling is always also possible in addition to the feeding in of current and/or signals The plug-in elements can each be designed in accordance with protection class IP65 or higher. Accordingly, the total linear motor together with the plug connector can also correspond to protection class IP65 or higher.

The plug connector preferably has an additional device. Such a device can, for example, be a power supply unit for a sensor-actuator unit (for example, for an RFID reading device) or a fieldbus component. The additional device can be directly integrated into the plug connector such that it does not have to be connected to the plug connector from external. It is thus quickly and easily possible to integrate the functionality of the additional device into the transport system by simply selecting and attaching only the corresponding plug connector.

Generally speaking, the additional device can e.g. have a digital component, such as a processor or a memory chip, or an electrical converter unit, such as a transformer or a switching power supply unit. The memory chip can e.g. enable the identification of the plug connector, in particular by means of a data link, in particular a wired data link.

The transformer can in particular be a transformer for coupling in Ethernet signals, e.g. a transformer from the ALT series of the company TDK. The Ethernet signals can in this respect also be used for the fieldbus.

The neighboring linear motors can preferably each be connected to one another by two plug connectors, namely by a first plug connector that establishes, in particular solely establishes, a power connection between the neighboring linear motors, and by a second plug connector that establishes, in particular solely establishes, a signal connection between the neighboring linear motors. It is thus ensured that, on the one hand, a power connection exists between the individual linear motors such that the transport system is supplied with electrical power and, on the other hand, a data communication can take place in the transport system.

The safe force off signal mentioned later is preferably transmitted with the signal connection in the same plug connector. However, it is also possible that the safe force off signal is transmitted with the power connection in the same plug connector.

Interference, in particular of the data signals, is avoided by the spatial separation of power and data signals.

The first plug connector can in particular be provided at a lower side of the linear motor and the second plug connector can in particular be provided at an upper side of the linear motor, or vice versa, such that the linear motors are aligned with one another at two oppositely disposed sides.

Accordingly, a respective linear motor can have a first and a second connection region at the upper side and a first and a second connection region at the lower side.

In an advantageous embodiment, the linear motors each have a power section and a signal section, with the first plug connector contacting the power section and the second plug connector contacting the signal section. For example, the signal section can be provided at the upper side of the linear motor and the power section can be provided at the lower side of the linear motor. The signal section serves for the data communication within the transport system, i.e. the data communication with the linear motors, and the power section serves for the supply of the linear motors with electrical power. Accordingly, the first plug connector serves for the power transmission between neighboring linear motors and, if necessary, for the feeding in of current and the second plug connector serves for the data communication between the neighboring linear motors.

The plug connector preferably has an identification feature that can in particular be read out electronically. The type of plug connector and in particular possible additional connections provided in the third plug-in region can thereby already be automatically directly recognized on the connection of the plug connector to the linear motors.

In an advantageous embodiment, the plug connector can have an alignment aid for aligning the neighboring linear motors with one another. In particular at least one plug connector for the power connection of two neighboring linear motors is preferably provided with the alignment aid. It is particularly preferred if all the plug connectors for the power connection provided in the transport system have an alignment aid.

The alignment aid can in particular be arranged at a free end of a base body of the plug connector. In particular in the plugged state of the plug connector, this free end can be arranged in the region of the outer side of the neighboring linear motors, and thus in the region of the guide track and in the coils. The alignment aid can extend approximately perpendicular away from the base body.

Respective cut-outs, into which the alignment aid can engage, can be formed at the linear motors, in particular in the region of the outer side. The alignment aid for aligning two neighboring linear motors in particular engages into the cut-outs of these linear motors, wherein the alignment aid is preferably at least regionally arranged in a form-fitted manner in the cut-outs. The alignment effect is in particular achieved by the form fit.

To produce the form fit, the alignment aid can have a wedge-shaped region that engages into a corresponding wedge-shaped cut-out of the linear motor. A projection, e.g. a parallelepiped-shaped projection, can project from the wedge-shaped region of the alignment aid and further reinforces a form-fitted connection to the cut-outs.

The alignment of the neighboring linear motors with one another is facilitated by the alignment aid during the assembly of the multi-carrier system. After the linear motors have been aligned with one another, the linear motors can e.g. be screwed tight to a carrier.

To optimize the magnetic flux between neighboring linear motors, the alignment aid can further comprise a magnetic material, in particular a soft magnetic material such as iron, and can be arranged in the region of the coils. The wedge-shaped region and/or the parallelepiped-shaped projection is/are formed from the magnetic material.

A possible specific embodiment of the transport system in accordance with the invention is a multi-carrier system that comprises a plurality of linear motors, which are arranged in a row and form a guide track, and at least one transport element that is movable along the guide track by means of the linear motors. The linear motors each have a power section arranged at the lower side and a signal section arranged at the upper side. The linear motors each have a first connection region at the power section and a first connection region at the signal section, which face and are associated with a linear motor disposed upstream along the guide track, and a second connection region at the power section and a second connection region at the signal section that face and are associated with a linear motor disposed downstream along the guide track, wherein a respective plug connector mechanically connects the two first connection regions of a linear motor disposed downstream along the guide track and the two second connection regions of a linear motor disposed upstream along the guide track to one another and establishes a power connection or a signal connection between the neighboring linear motors. In this respect, the first plug connector contacts the power sections and the second plug connector contacts the signal sections. The first connection regions of the linear motors are each identically arranged and formed at the linear motors and the second connection regions of the linear motors are each identically arranged and formed at the linear motors. The respective mutually associated first connection regions of the linear motor disposed downstream along the guide track and the second connection regions of the linear motor disposed upstream along the guide track together form a reception region in which the respective plug connector is received.

The reception regions are preferably formed as rectangular pockets having rounded corners in which a plate-shaped base body of the respective plug connector is disposed in a flush manner. The reception region has a recess which extends away from the depression and into which a secondary section of the plug connector engages in a flush manner.

A further subject of the invention is a set for assembling a transport system, in particular a multi-carrier system, that has a plurality of linear motors and a plurality of plug connectors, in particular different plug connectors, wherein the linear motors each have at least a first connection region and a second connection region, wherein in each case the first connection region of one of the linear motors and the second connection region of a further one of the linear motors are suitable to be turned toward, i.e. to face one another, and associated with one another and to be mechanically connected to one another by one of the plug connectors, wherein the first connection regions of the linear motors are each identically arranged and formed at the linear motors, and wherein the second connection regions of the linear motors are each identically arranged and formed at the linear motors, wherein the plurality of plug connectors comprise

- at least one plug connector for establishing a power connection and/or a signal connection between the neighboring linear motors; and/or
- at least one plug connector for establishing only a power connection between the neighboring linear motors; and/or
- at least one plug connector for establishing only a signal connection between the neighboring linear motors; and/or
- at least one plug connector for feeding in current and/or signals; and/or
- at least one plug connector for connecting to an additional device.

All the plug connectors included in the transport system and/or in the set can preferably have the same base body such that a mechanical compatibility of the plug connectors with one another is provided.

Insofar as the aforementioned set comprises different plug connectors, the respective plug connectors can also be included in the set a plurality of times. The transport system and/or the set preferably comprises/comprise one or more of the aforementioned plug connectors a plurality of times, in particular at least three times, five times, or ten times. If e.g. ten identical connectors are present, these ten connectors can be interchanged with one another.

In accordance with an embodiment, at least two functional groups of linear motors are produced within the transport system by means of the plug connectors. A functional group can in this respect have one or more linear motors. A group of linear motors can, for example, form a safety group, wherein e.g. all the linear motors of the group are simultaneously switched off in a dangerous state. The transport system can alternatively also have only one functional group, in particular a safety group.

The shutdown can in particular take place via a so-called safe force off signal, a signal for a safety shutdown. The safe force off signal therefore effects the switching on (when the safe force off signal is switched on) and the switching off (when the safe force off signal is switched off) of an end stage by means of the power electronics of a linear motor.

The linear motors to which the same safe force off signal is supplied are also designated as the safe force off group. In this respect, a safe force off group is a group of segments (linear motors). The segments of the transport system can, as mentioned, be divided into a plurality of these groups, wherein there is a connection (preferably a signal connection) between the linear motors within these groups by means of the respective plug connectors, but these groups are cut off from the safe force off signal of adjacent groups for safety reasons.

The safe force off signal comprises a current of less than 100 mA per segment and is preferably transmitted in plug connectors for a signal connection. To now be able to form different groups with different safe force off signals (i.e. safe force off groups), different plug connectors are provided in the transport system and/or in the set:

- a plug connector that transmits the safe force off signal between two neighboring linear motors (bridge); and/or
- a plug connector that transmits the safe force off signal between two neighboring linear motors and simultaneously permits a feeding in of the safe force off signal to both of the linear motors directly connected to the plug connector; and/or
- a plug connector that does not transmit the safe force off signal between two neighboring linear motors (separator); and/or
- a plug connector that does not transmit the safe force off signal between two neighboring linear motors and simultaneously permits a feeding in of a safe force off signal to only one of the linear motors directly connected to the plug connector.

The aforementioned plug connectors can establish a signal connection between two neighboring linear motors even though the same plug connector does not transmit the safe force off signal and acts as a separator. A signal connection is thereby e.g. established between all the linear motors; only the switching on of the linear motors takes place via the safe force off signal.

Alternatively, plug connectors acting as separators can also not have a signal connection between the neighboring linear motors.

In parallel with a feeding in of the safe force off signal, further signals can also be fed in by means of the plug connector.

The cutting off from the power connection takes place in that, when a switched-off safe force off signal is present, the power electronics of the linear motors cut off the respective affected linear motors of the safety group from the power supply by switching off an end stage. Due to this power interruption, a separation of two adjacent groups with respect to electrical power is present at the corresponding point.

The corresponding plug connectors can simultaneously, preferably at the third plug-in region, have a possibility of feeding in signals in only one direction such that a signal connection is established from the outside to only either the linear motor disposed downstream, and thus the group downstream, or only the linear motor disposed upstream, and thus the group disposed upstream.

The set serves for the assembly of a transport system, in particular a multi-carrier system, wherein, due to the identical arrangement and design of the first and second connection regions, the plug connectors can be replaced as desired depending on the requirement and the linear motors can be arranged in any desired order with respect to one another depending on the requirement for the topology of the transport system. Thus, the transport system has an extremely high modularity, whereby, on the one hand, the topology of the transport system can be changed quickly and easily and, on the other hand, additional devices can be connected as required or an additional electrical power can be fed in with little effort.

Furthermore, in the transport system and/or in the set, plug connectors can be provided that
- enable a segment-to-segment communication (S2S) between two neighboring linear motors; and/or
- extend a segment-to-segment communication (S2S) between two neighboring linear motors by an external connection (for example, for communication with an adjacent transport system); and/or
- interrupt a segment-to-segment communication (S2S) between two neighboring linear motors; and/or
- enable a fieldbus communication between two neighboring linear motors; and/or
- interrupt a fieldbus communication between two neighboring linear motors; and/or
- externally couple a fieldbus communication into one or both of the neighboring linear motors.

As with the safe force off signal, groups of linear motors, which exhibit different behaviors, can therefore also be formed by the segment-to-segment communication and by means of the fieldbus communication. The groups that are formed by the safe force off signal, the segment-to-segment communication, and the fieldbus communication are preferably identical (i.e. each comprise the same linear motors).

The method in accordance with the invention of retrofitting a plug connector in a transport system that has a plurality of linear motors, which are arranged in a row and are peripherally arranged and form a guide track, wherein the linear motors each have at least a first connection region, which faces a linear motor disposed upstream along the guide track, and a second connection region, which faces a linear motor disposed downstream along the guide track, wherein a respective plug connector mechanically connects the first connection region of a linear motor disposed downstream along the guide track and the second connection region of a linear motor disposed upstream along the guide track to one another and establishes a power connection and/or a signal connection between the neighboring linear motors, comprises the following steps:
- removing the plug connector from the connection regions of two neighboring linear motors;
- inserting a further plug connector into the connection regions such that the further plug connector mechanically connects the two neighboring linear motors to one another and establishes a power connection and/or a signal connection between the neighboring linear motors.

The removal and the insertion are in particular possible without problem through simple plug connectors. The method may thereby be very simple and uncomplicated such that the retrofitting of a plug connector is possible very quickly. By inserting the further plug connector, i.e. a different plug connector than the one previously removed, the neighboring linear motors are again aligned with one another and are thus mechanically connected to one another. In addition, a power connection and/or a signal connection is/are established between the neighboring linear motors. Thus, further steps are not required for the mechanical connection or the electrical connection.

In the method, a power supply, a fieldbus, or a sensor-actuator unit (for example, an RFID reading device) is connected to a third plug-in region of the further plug connector. Due to the further/new plug connector, a power feed can therefore e.g. be retrofitted in a simple manner.

The statements made herein regarding the transport system accordingly apply to the set in accordance with the invention as well as to the method in accordance with the invention. This in particular applies with respect to the advantages mentioned and the preferred embodiments.

The invention will be described schematically and by way of example with reference to the drawings. It is shown therein.

Figure 1:
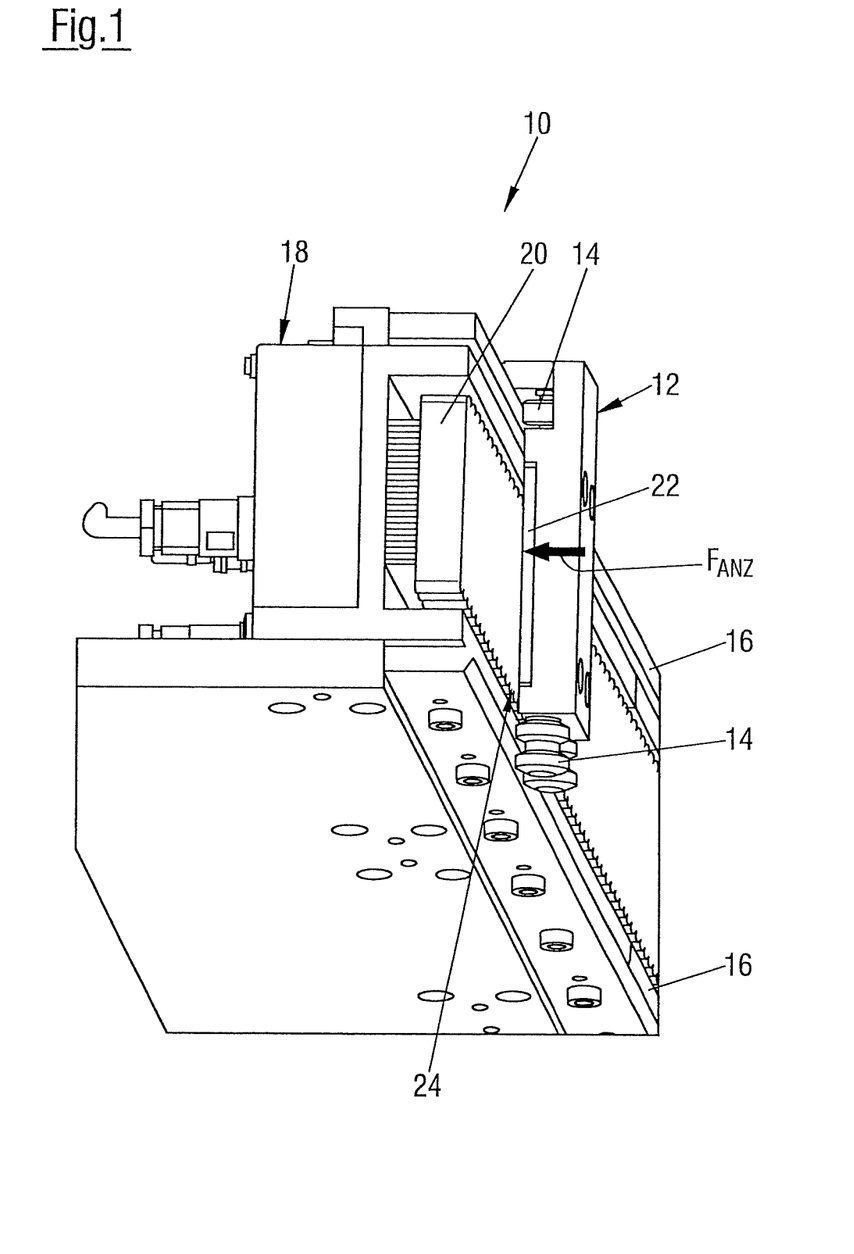
FIG. 1 a perspective detailed view of a multi-carrier system.

FIG. 1 shows a detail of a multi-carrier system 10 in a perspective view from below in which a transport element 12, i.e. a carrier, comprising rollers 14 is disposed on a guide track 16 comprising two vertically spaced apart rails. The guide track 16 is part of a linear motor 18.

The linear motor 18 comprises a plurality of coils 20 that are arranged along the guide track 16 between the rails. The coils 20 generate a magnetic field that acts on a permanent magnet 22 of the transport element 12 and that moves the transport element 12 along the guide track 16. The coils 20 of the linear motor 18 are spaced apart from the permanent magnet 22 by an air gap 24. The air gap 24 extends in a vertical direction, which means that the transport element 12 travels along an outer side of the multi-carrier system 10.

The permanent magnet 22 is attracted by the linear motor 18 and thereby generates an attractive force $F_{ANZ}$ that presses the transport element 12 onto the guide track 16 at its rollers 14.

Figure 2:
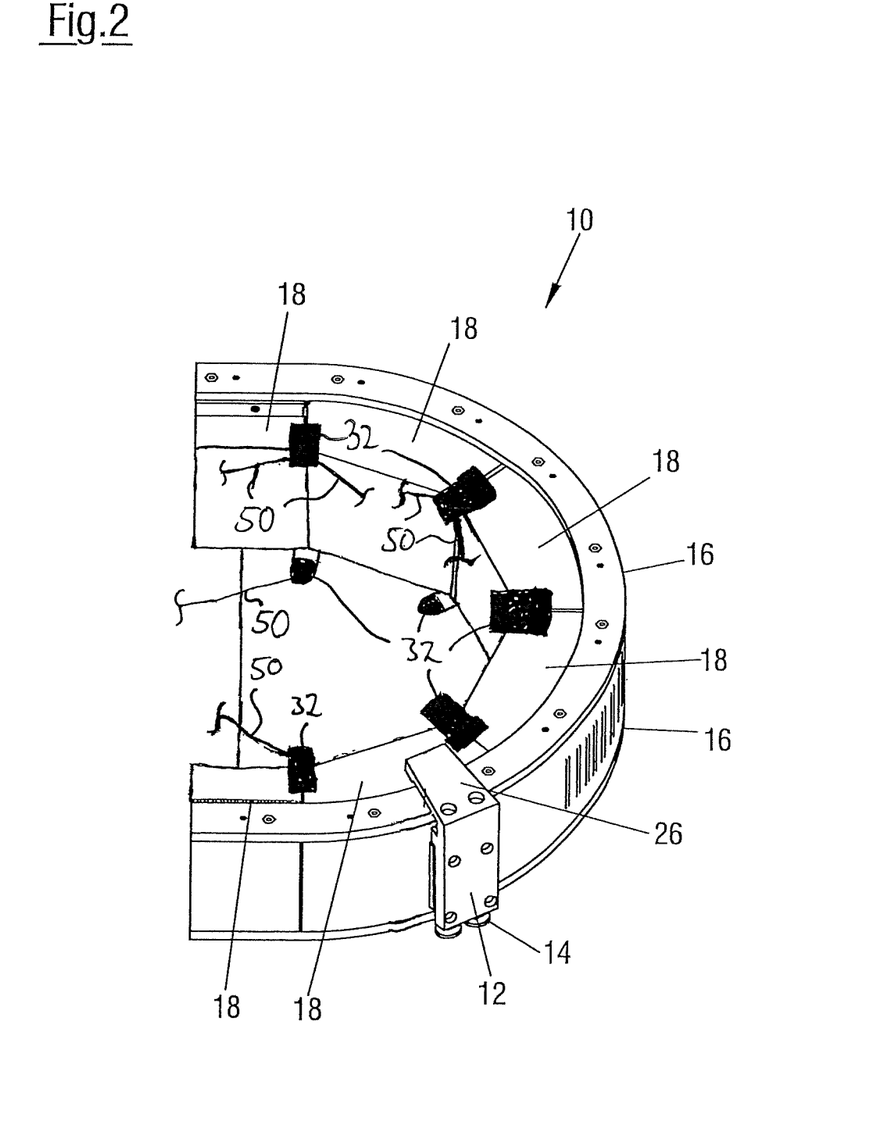
FIG. 2 a perspective part view of the multi-carrier system.

FIG. 2 shows the multi-carrier system 10 in a perspective view from above. It can be recognized therein that a plurality of linear motors 18 are arranged in a row such that a continuous guide track 16 results. The linear motors 18 are each connected to neighboring linear motors 18 by plug connectors 32, wherein the plug connectors 32 are located at the upper side and at the lower side of the linear motors 18. One or two lines 50, which, as will be described in more detail in the following, serve for the feeding of electrical power or for data communication, are connected to some of the plug connectors 32.

Figure 3:
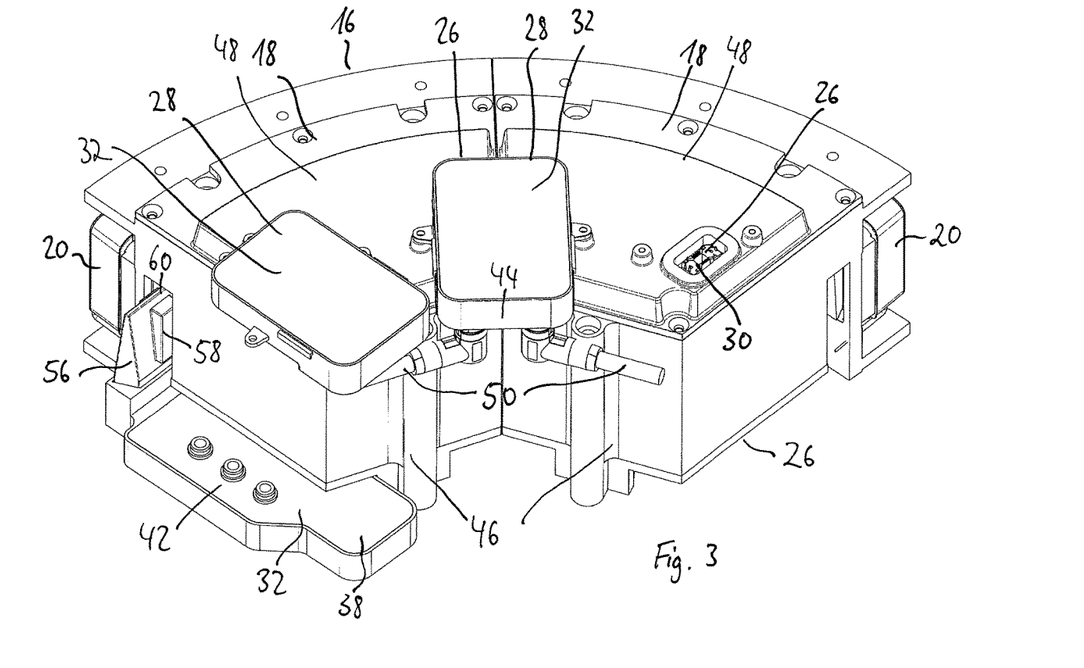
FIG. 3 a perspective view of two neighboring linear motors.
Figure 4:
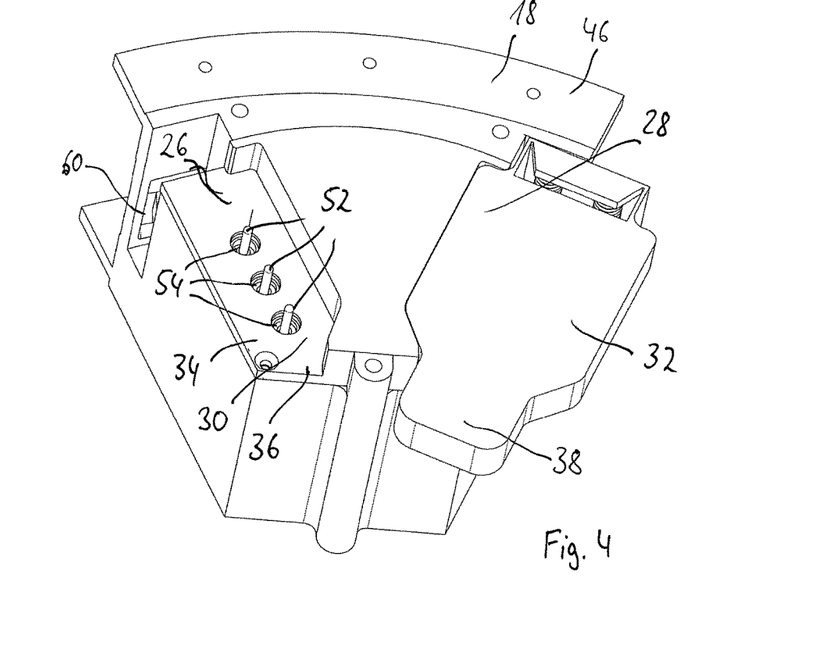
FIG. 4 a perspective view of an individual linear motor.
Figure 5:
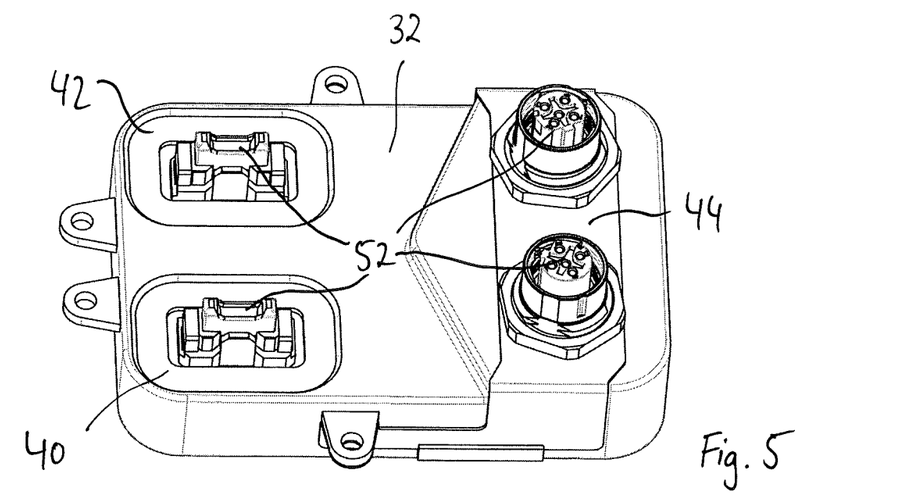
FIG. 5 a view of a plug connector for a signal connection of two linear motors.
Figure 6:
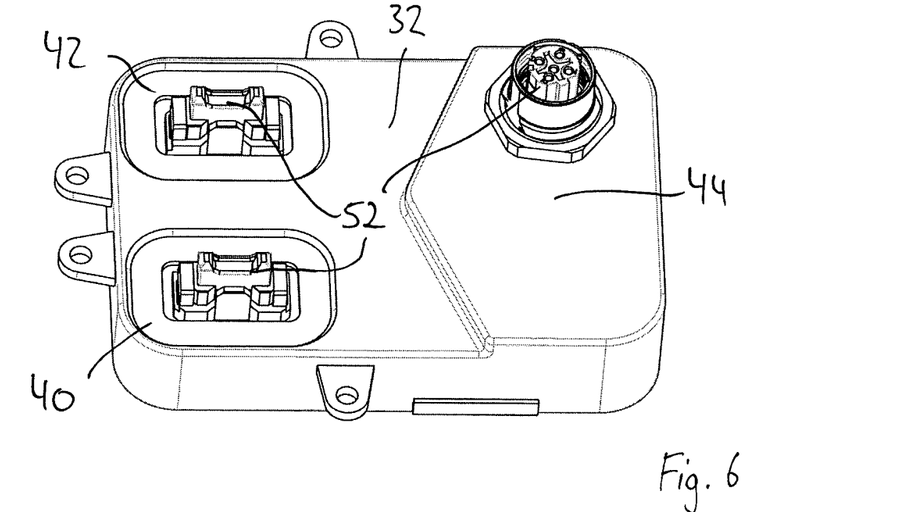
FIG. 6 a view of a further plug connector for a signal connection of two linear motors.

Detailed views of linear motors 18 can be seen from FIG. 3 and FIG. 4, wherein FIG. 3 shows two neighboring linear motors 18 with a view of their upper side and lower side, and wherein FIG. 4 shows a single linear motor 18 with a view of its lower and inner sides. The linear motors 18 each have first connection regions 26, which face the linear motor 18 disposed upstream along the guide track 16, at their lower side and at their upper side. The linear motors 18 likewise have second connection regions 28, which face the linear motor 18 located downstream along the guide track 16, at their upper side and at their lower side.

As can in particular be seen from FIG. 3, in each case a first connection region 26 and a second connection region 28 of neighboring linear motors 18 together form a reception region 30 in which a respective plug connector 32 is received. In this respect, FIG. 4 also shows a first connection region 26 which is arranged at the lower side and in which no plug connector 32 is shown for illustration purposes. The first connection region 26 is a depression 34 that is approximately rectangular with rounded corners. Plug-in elements 52 configured as contacts are provided in the depression 34, with three pins being provided as plug-in elements 52 in the present embodiment. The plug-in elements 52 are sealed by seals 54. The depression 34 forms the reception region 30 for a plug connector 32 together with a further depression of an adjacent linear motor 18 (not shown in FIG. 4) that is formed symmetrically to the depression 34. The plug connector 32 can in particular be rectangular with rounded corners and plate-shaped to be able to be inserted into the reception region 30 formed in this way and to contact the wall of the depression 34 in a flush manner.

As in particular FIG. 3 shows, the reception region 30 formed therein at the bottom between the two linear motors 18 forms a recess 36 in which a secondary section 38 of the corresponding plug connector 32 is arranged. The secondary section 38 contacts the recess 36 in a flush manner such that the secondary section 38 contributes towards the alignment of the two linear motors 18.

The linear motors shown in FIGS. 3 and 4 each have a power section 46 and a signal section 48 concealed in FIG. 4. The signal section 48 respectively serves for the data communication between the neighboring linear motors 18, and thus within the transport system 10, and the power sections 46 provided at the lower side serve for the supply of the linear motors 18 with the electrical power. Accordingly, plug connectors 32 that are suitable for establishing a signal connection between the neighboring linear motors 18 are provided at the signal sections 48. Plug connectors 32 that are suitable for providing a power connection between the neighboring linear motors 18 are provided at the power sections 46. The plug connectors 32 in the different embodiments will be described in more detail in the following. As can also be seen in FIG. 3, lines 50 are connected to the plug connector 32 that contacts the signal sections 48 of the two linear motors 18. The lines 50 serve for the connection of additional devices, for example, sensor-actuator units or a fieldbus component. Furthermore, it is also possible to establish the connection of a fieldbus into the transport system 10 by means of a linear motor 18. Similarly, a power supply, can, for example, be connected via the plug connector 32, which contacts the power sections 46 of the two linear motors 18, in order to feed electrical power into the respective segment as needed.

Figure 7:
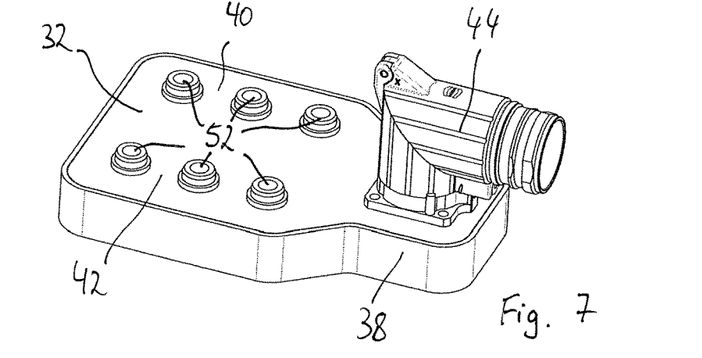
FIG. 7 a perspective view of a plug connector for a power connection of two neighboring linear motors.
Figure 8:
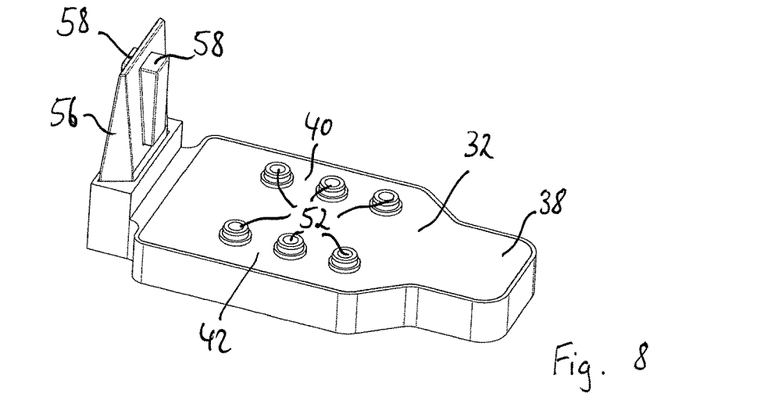
FIG. 8 a perspective view of a further plug connector for a power connection of two neighboring linear motors that has an alignment aid.

As can be seen from FIGS. 5 to 8, the plug connectors 32 each have a first plug-in region 40, a second plug-in region 42, and, optionally, a third plug-in region 44. In this respect, FIGS. 5 and 6 each show plug connectors 32 that are provided for transmitting data, i.e. that contact the signal section 48 of the respective linear motor 18, and FIGS. 7 and 8 each show a plug connector 32 that is configured to transmit electric current and that is attached to the power section 46 of the respective linear motors. The plug-in elements 52 of FIG. 5 and FIG. 6 at the left in the Figures are designed with a high polarity for data transmission, whereas the plug-in elements 52 in FIGS. 7 and 8 are configured to transmit high currents.

The first plug-in region 40, the second plug-in region 42, and the third plug-in region 44 each have plug-in elements 52. Said plug-in elements 52 can, for example, be configured as sockets, as contacts, or as individual plugs.

The first connection regions 26, the second connection regions 28 and, thereby, the reception regions 30 are formed identically with respect to the respective suitable plug connectors 32 such that the plug connectors 32 match one another depending on whether only a bridge is to be established between neighboring linear motors 18 or devices are additionally to be fed in. In this respect, the plug connectors 32, or at least a part section of the plug connector 32, are disposed in a flush manner in the respective reception regions 30 such that they align the linear motors 18 with one another. Since the first connection regions 26 and the second connection regions 28 are identically formed and are identically arranged at the surfaces of the linear motors 18, the linear motors 18 can furthermore be arranged in a row with in any desired order respect to one another such that the topology of a transport system 10 can be changed, in particular extended or converted, quickly and without complication.

As shown in FIG. 8, the plug connectors 32, in particular plug connectors 32 for a power connection, can have an alignment aid 56. The alignment aid 56 is arranged at a free end of a base body of the plug connector 32 and extends away therefrom approximately perpendicular to and preferably in parallel with the plug connector elements 52. The alignment aid 56 is preferably arranged at a free end of the base body that, in the plugged state, faces the outer side of the neighboring linear motors 18 and thus the guide track 16 and the coils 20. In the present example, the alignment aid 56 has a wedge shape with projections 58 projecting from both sides.

Figure 9:
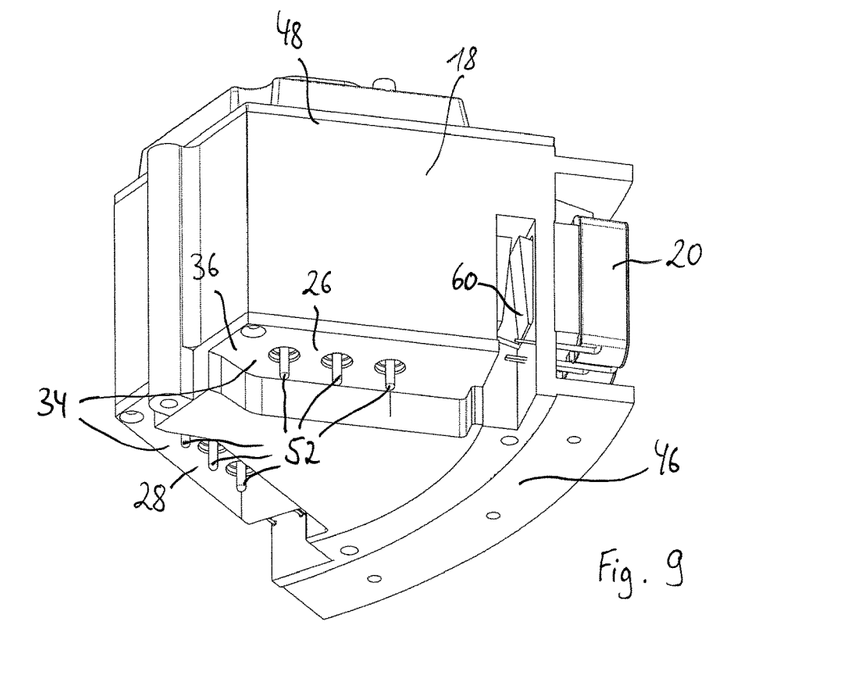
FIG. 9 a perspective view of an individual linear motor.

As in particular FIGS. 3 and 9 show, the linear motors 18 can each have cut-outs 60 that are preferably formed at their outer side. Furthermore, the cut-outs 60 are configured such that they form an opening in the respective side surfaces of the linear motors 18. The cut-outs 60 are bounded by boundary surfaces of the magnetically conductive stators of the linear motors 18 and are configured such that the alignment aid 56 can engage into the cut-outs 60 when a plug connector 32, which has an alignment aid 56, is connected to the respective linear motor 18. In this respect, the alignment aid 56 in particular engages into the cut-outs 60 of two neighboring linear motors 18, wherein a form-fitted connection to the cut-outs 60 is established by means of the projections 58. The alignment of the neighboring linear motors 18 with one another is thereby facilitated during the assembly of the multi-carrier system. Furthermore, the alignment aid 56 can be composed of a magnetic material, in particular a soft magnetic material such as iron, in order to enable or improve a magnetic flux between neighboring linear motors 18 (or their stators).

It can be seen from the preceding statements that the interaction of plug connectors 32 and linear motors 18 can implement a wide variety of application scenarios. Due to the transport system 10 in accordance with the invention, a very high modularity thus results that makes it possible to quickly react to changing requirements and to adapt the transport system 10 to them with little effort and, if necessary, to incorporate additional devices into the transport system 10.

REFERENCE NUMERAL LIST 10 multi-carrier system
12 transport element (carrier)
14 rollers
16 guide track
18 linear motor
20 coil
22 permanent magnet
24 air gap
26 first connection region
28 second connection region
30 reception region
32 plug connector
34 depression
36 recess
38 secondary section
40 first plug-in region
42 second plug-in region
44 third plug-in region
46 power section
48 signal section
50 line
52 plug-in element
54 seal
56 alignment aid
58 projection
60 cut-out
$F_{ANZ}$ attractive force

The invention claimed is:

1. A transport system, comprising:
a plurality of linear motors, which are arranged in a row and form a guide track, and
at least one transport element that can be moved along the guide track with the linear motors,
wherein the linear motors each have at least a first connection region, which faces and is associated with a linear motor disposed upstream along the guide track, and a second connection region, which faces and is associated with a linear motor disposed downstream along the guide track, wherein a respective plug connector mechanically connects the first connection region of a linear motor disposed downstream along the guide track and the second connection region of a linear motor disposed upstream along the guide track to one another and establishes at least one of a power connection and a signal connection between neighboring linear motors,
wherein the first connection regions of the linear motors are each identically arranged and formed at the linear motors, and wherein the second connection regions of the linear motors are each identically arranged and formed at the linear motors such that the linear motors and the plug connectors are replaceable;
wherein in each case the first connection region of a linear motor disposed downstream along the guide track and the second connection region of a linear motor disposed upstream along the guide track merge into one another and together form a reception region in which a respective plug connector is received; and
wherein the neighboring linear motors each have a depression, the depressions together forming the reception region for the plug connector.

2. The transport system in accordance with claim 1, wherein the plug connector is disposed in a flush manner in the reception region and aligning the neighboring linear motors with respect to one another.

3. The transport system in accordance with claim 1, wherein the reception region has a recess extending away from the depression, with the plug connector having a secondary section.

4. The transport system in accordance with claim 3, wherein the secondary section engages into the recess in a flush manner.

5. The transport system in accordance with claim 1, wherein the plug connector has a first plug-in region, which contacts one of the neighboring linear motors, and a second plug-in region that contacts the other of the neighboring linear motors.

6. The transport system in accordance with claim 5, wherein the plug connector has a third plug-in region for feeding in at least one of current and signals.

7. The transport system in accordance with claim 6, wherein the signals comprise a signal for a safety shutdown.

8. The transport system in accordance with claim 6, wherein the third plug-in region is configured to be connected to one of a power supply, a fieldbus, and a sensor-actuator unit.

9. The transport system in accordance with claim 8, wherein the sensor-actuator unit is an RFID reading device.

10. The transport system in accordance with claim 1, wherein the plug connector has an additional device.

11. The transport system in accordance with claim 10, wherein the additional device is one of a power supply unit for a sensor-actuator unit and a fieldbus component.

12. The transport system in accordance with claim 1, wherein the neighboring linear motors are connected to one another by a first plug connector, which establishes a power connection between the neighboring linear motors, and a second plug connector that establishes a signal connection between the neighboring linear motors.

13. The transport system in accordance with claim 12, wherein the linear motors each have a power section and a signal section, with the first plug connector contacting the power section and the second plug connector contacting the signal section.

14. The transport system in accordance with claim 1, wherein the plug connector has an identification feature.

15. The transport system in accordance with claim 14, wherein the identification feature can be read out electronically.

16. The transport system in accordance with claim 1, wherein the plug connector has an alignment aid for aligning the neighboring linear motors with one another.

17. The transport system in accordance with claim 16, wherein the alignment aid transmits a magnetic flux between neighboring linear motors.

18. The transport system in accordance with claim 1, wherein at least two functional groups of linear motors are produced within the transport system with the plug connectors.

19. The transport system in accordance with claim 1, wherein the transport system is a multi-carrier system.

20. A set for assembling a transport system in accordance with claim 1, said set comprising a plurality of linear motors and a plurality of plug connectors,
- wherein the linear motors each have at least a first connection region and a second connection region, wherein in each case the first connection region of one of the linear motors and the second connection region of a further one of the linear motors are suitable to face one another and to be associated with one another and to be mechanically connected to one another by one of the plug connectors, wherein the first connection regions of the linear motors are each identically arranged and formed at the linear motors, and wherein the second connection regions of the linear motors are each identically arranged and formed at the linear motors, wherein the plurality of plug connectors comprise
- at least one plug connector for establishing a power connection and/or a signal connection between neighboring linear motors; and/or
- at least one plug connector for establishing only a power connection between the neighboring linear motors; and/or
- at least one plug connector for establishing only a signal connection between the neighboring linear motors; and/or
- at least one plug connector for feeding in current and/or signals; and/or
- at least one plug connector for connecting to an additional device.

21. The set in accordance with claim 20, wherein the plurality of plug connectors comprise different plug connectors.

22. A method of retrofitting a plug connector in a transport system that has a plurality of linear motors, which are arranged in a row and form a guide track, wherein the linear motors each have at least a first connection region, which faces a linear motor disposed upstream along the guide track, and a second connection region, which faces a linear motor disposed downstream along the guide track, wherein a respective plug connector mechanically connects the first connection region of a linear motor disposed downstream along the guide track and the second connection region of a linear motor disposed upstream along the guide track to one another and establishes a power connection and/or a signal connection between neighboring linear motors, wherein the method comprises:
- removing the plug connector from the connection regions of two neighboring linear motors; and
- inserting a further plug connector into the connection regions such that the further plug connector mechanically connects the two neighboring linear motors to one another and establishes a power connection and/or a signal connection between the neighboring linear motors.

* * * * *